US007063609B1

(12) United States Patent
Joseph

(10) Patent No.: US 7,063,609 B1
(45) Date of Patent: Jun. 20, 2006

(54) APPARATUS FOR PEELING CRUSTACEA SUCH AS CRAWFISH

(76) Inventor: Wascome Joseph, 19210 Bengal Ct., Baton Rouge, LA (US) 70817-6701

( * ) Notice: Subject to any disclaimer, the term of this patent is extended or adjusted under 35 U.S.C. 154(b) by 0 days.

(21) Appl. No.: 10/850,026

(22) Filed: May 20, 2004

Related U.S. Application Data

(60) Provisional application No. 60/475,009, filed on Jun. 2, 2003.

(51) Int. Cl.
*A22C 25/00* (2006.01)

(52) U.S. Cl. .......................................................... 452/5

(58) Field of Classification Search ................ 452/2–6, 452/102–105
See application file for complete search history.

(56) References Cited

U.S. PATENT DOCUMENTS

| 2,702,921 | A | * | 3/1955 | Pinney ............................ | 452/5 |
| 4,133,078 | A | | 1/1979 | Cromwell | |
| D253,219 | S | | 10/1979 | Meyer | |
| 4,507,825 | A | * | 4/1985 | Betts et al. ..................... | 452/2 |
| 4,553,287 | A | | 11/1985 | DeSordi et al. | |
| 4,610,052 | A | | 9/1986 | Lubcke | |
| 4,785,503 | A | * | 11/1988 | Gomez ............................ | 452/3 |
| 4,787,123 | A | | 11/1988 | Geddings | |
| 4,941,233 | A | * | 7/1990 | Allain ............................. | 452/4 |
| D313,923 | S | | 1/1991 | Poe, Jr. | |
| 5,055,085 | A | * | 10/1991 | Thibodeaux .................... | 452/5 |
| 5,403,230 | A | | 4/1995 | Caprigilone, Sr. | |
| 5,586,931 | A | | 12/1996 | Williams, Jr. | |
| 5,830,049 | A | | 11/1998 | Haley et al. | |
| 6,036,596 | A | | 3/2000 | Lay | |
| 6,117,467 | A | * | 9/2000 | Huling ............................ | 426/281 |
| 6,390,911 | B1 | | 5/2002 | Lombardo | |
| 6,517,873 | B1 | * | 2/2003 | Furuna et al. .................. | 426/6 |

FOREIGN PATENT DOCUMENTS

JP          2000107004          4/2000

* cited by examiner

*Primary Examiner*—Thomas Price
(74) *Attorney, Agent, or Firm*—Garvey, Smith, Nehrbass & North, L.L.C.; Charles C. Garvey, Jr.

(57) ABSTRACT

A crawfish peeling device provides a post that can be mounted on a tray. The post has first and second end portions, the first end portion having a slotted passageway, appointed tip, a pair of tapered flanges that are spaced apart on opposite sides of the slotted passageway and a ramp that is at the bottom of the slotted portion for catching the edible meat product when the user threads the tail upon the tip and then moves the tail from the first to the second end portion of the post. The present invention also provides an improved method of peeling a crustacea such as a crawfish or crawfish that includes the step of providing a post that has first and second end portions, the first end portion having a tip, a slot, tapered flanges on opposite sides of the slot, and a ramp at one end portion of the slot opposite the tip. The crawfish tail is threaded upon the tip. The tail is then moved toward the ramp. The tip and flanges are used to spread apart the tail shell section so that the edible meat product remains in the slot. The ramp can optionally be used to eject the edible meat product from the slot.

9 Claims, 3 Drawing Sheets

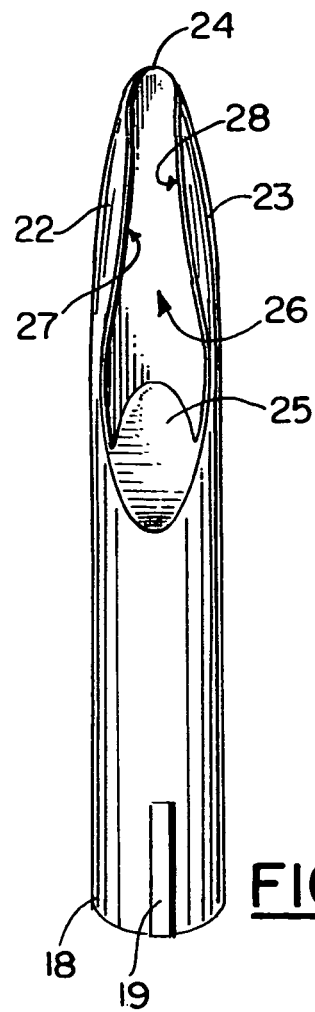
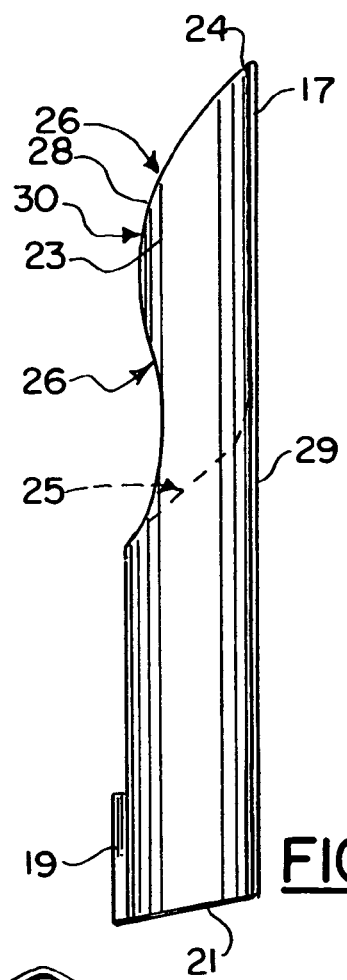
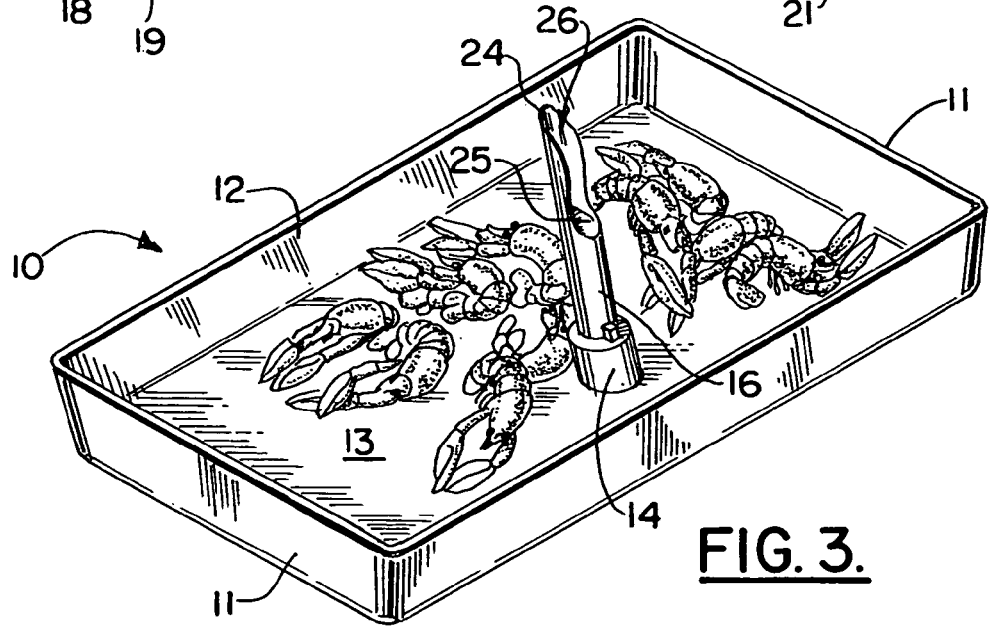

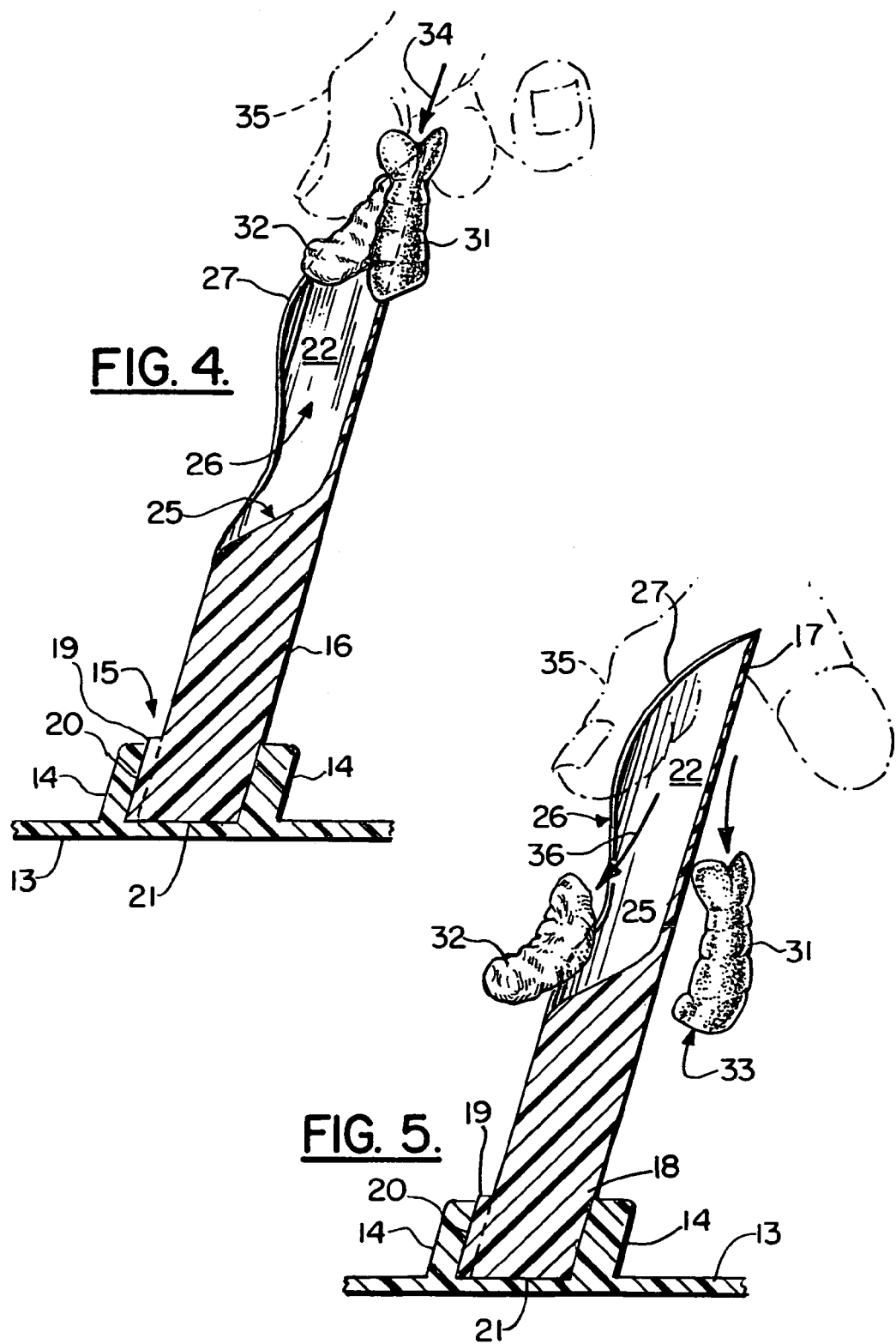

APPARATUS FOR PEELING CRUSTACEA SUCH AS CRAWFISH

CROSS-REFERENCE TO RELATED APPLICATIONS

Priority of U.S. Provisional Patent Application Ser. No. 60/475,009, filed Jun. 2, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the manual processing of certain crustacea, namely crawfish or crayfish. More particularly, the present invention relates to an improved method and apparatus for peeling crustacea such as crawfish or crayfish, wherein an inclined post provides a specially shaped upper end portion that has opposed curved flanges of varying size with a slot therebetween, and wherein a ramp positioned below the slot ejects the meat portion of the crawfish of crayfish tail when the tail is threaded upon the post and manually pulled in a downwardly direction.

2. General Background of the Invention

Certain crustacea such as crawfish or crayfish are manually processed by removing the edible meat portion from the tail of the cooked body. Manually peeling such food items can be a time consuming and frustrating task.

It is an object of the present invention to provide a peeling device that enables a user to manually and quickly separate the meat portion of the tail from the outer hard shell or skeleton.

The following U.S. patents disclose various devices for peeling crustacea:

TABLE

| PATENT NO. | TITLE | ISSUE DATE |
| --- | --- | --- |
| 2,692,428 | Orange Peeler | Oct. 26, 1954 |
| Des. 253,219 | Orange Peeler | Oct. 23, 1979 |
| 4,133,078 | Bivalve Opener | Jan. 9, 1979 |
| 4,553,287 | Device and Process for Cleaning Shrimp and the like | Nov. 19, 1985 |
| 4,610,052 | Shellfish Opening Tool | Sep. 9, 1986 |
| 4,787,123 | Oyster Shucking Device | Nov. 29, 1988 |
| Des. 313,923 | Clam and Oyster Knife | Jan. 22, 1991 |
| 5,403,230 | Shellfish Claw Cutter | Apr. 4, 1995 |
| 5,586,931 | Hand Operated Crab Leg | Dec. 24, 1996 |
| 5,830,049 | Method and Apparatus for Assisting in Crab Picking | Nov. 3, 1998 |
| 6,036,596 | Apparatus and Method for Removing Meat from a Crawfish Tail | Mar. 14, 2000 |
| JP2000107004 | | Apr. 18, 2000 |

BRIEF SUMMARY OF THE INVENTION

The present invention provides a method and apparatus for peeling crawfish, crayfish, or like crustacea. The apparatus includes a tray that supports a post, the post having first and second end portions. Another type of base can be used instead of a tray, such as a plate or platform. The post has a first end portion that has a pointed tip and that is slotted. A pair of flanges are spaced apart and positioned on opposite sides of the slotted portion of the post. A ramp can be provided at the bottom of the slotted portion of the post for catching the edible meat product when a user threads the tail upon a tip and moves the tail exoskeleton from the first toward the second end portion of the post.

The present invention provides an improved method of peeling a crawfish tail to separate the edible meat from the exoskeleton shell. The method includes providing a post that has first and second end portions, the first end portion having a tip, a slot, flanges on opposite sides of the slot and a ramp at an end of the slot that is opposite the tip.

The crawfish tail is threaded upon the tip. The tail is then moved toward the ramp. The tip end flanges of the post are used to spread apart the tail exoskeleton shell so that the edible byproduct is removed therefrom. A ramp can optionally be used for catching the edible meat product and ejecting it onto the surface of the tray or other supporting base or plate.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a partial front view of the preferred embodiment of the apparatus of the present invention;

FIG. 2 is a partial side view of the preferred embodiment of the apparatus of the present invention;

FIG. 3 is a perspective view of the preferred embodiment of the apparatus of the present invention;

FIG. 4 is a partial sectional elevation view of the preferred embodiment of the apparatus of the present invention illustrating the initial step of threading the crustacea tail upon the post;

FIG. 5 is a side sectional elevation view of the preferred embodiment of the apparatus of the present invention and illustrating the travel path of the edible meat portion after separation from the shell;

DETAILED DESCRIPTION OF THE INVENTION

Figure 6:
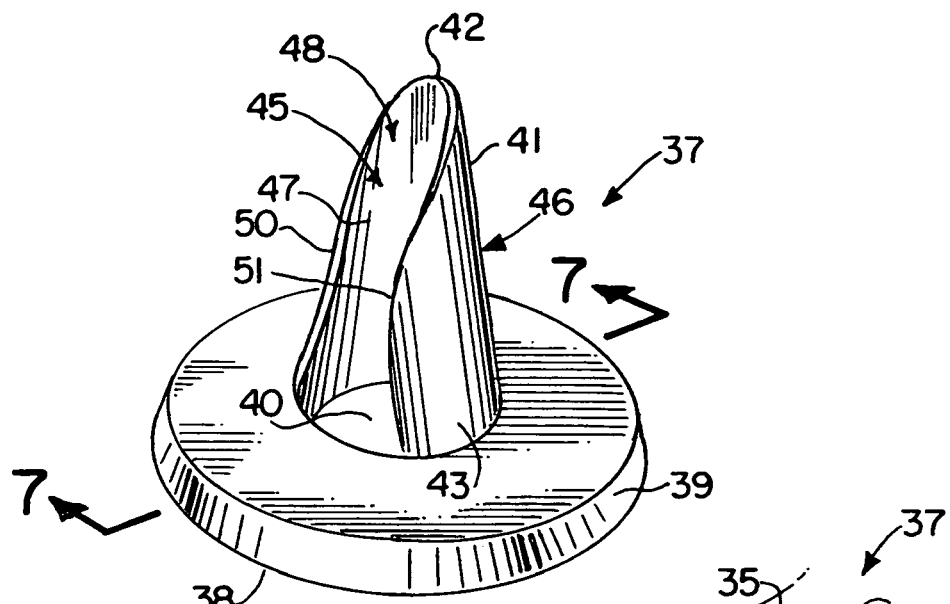
FIG. 6 is a perspective view of a second embodiment of the apparatus of the present invention.

FIGS. 1–3 show generally the preferred embodiment of the apparatus of the present invention designated by the numeral 10 in FIG. 3, a tray 11 can provide a plurality of side walls 12 and a bottom wall 13. A cylindrically shaped sleeve is connected to bottom wall 13 and can be integrally a part thereof as shown in FIGS. 3, 4 and 5.

The sleeve 14 can be generally cylindrically shaped and inclined as shown in FIGS. 4 and 5, providing a socket 15 for receiving post 16. Post 16 has an upper end portion 17 and a lower end portion 18. The lower end portion 18 is sized and shaped to fit socket 15 of sleeve 14. The lower end portion 18 of post 16 can be provided with a key 19 that fits a correspondingly shaped keyway or slot 20 in sleeve 14 as shown in FIGS. 4 and 5. In this fashion, the post 16 can be secured to not rotate relative to tray 11.

An inclined bottom surface 21 of post 16 fits snugly against bottom 13 as shown in FIGS. 4 and 5. A pair of opposed flanges 22, 23 extend downwardly from tip 24 to ramp 25. Slot 26 is positioned in between flanges 22, 23.

Each flange 22, 23 provides a smooth curved edge 27, 28 respectively that begins at tip 24 and which extends farther and farther from the rear 29 of post 16 up to position 30 in FIG. 4. Position 30 is about midway between tip 24 and the start of ramp 25. The gradually thickening flanges 22, 23 gradually separate a crustacea shell 31 from the edible meat product 32, when a user threads the larger, thicker end portion 33 of the shell 31 upon tip 24 and pushes downwardly in the direction of arrow 34 in FIG. 4.

In FIGS. 4 and 5, a user's hand is shown in phantom lines as reference numeral 35. As separation occurs, the edible meat product 32 falls in the direction of arrow 36, strikes ramp 25 and then falls to bottom wall 13 of tray 11.

The tray 11 and post 16 can be manufactured of plastic injection molded material, welded stainless steel or other food compatible material.

Figure 7:
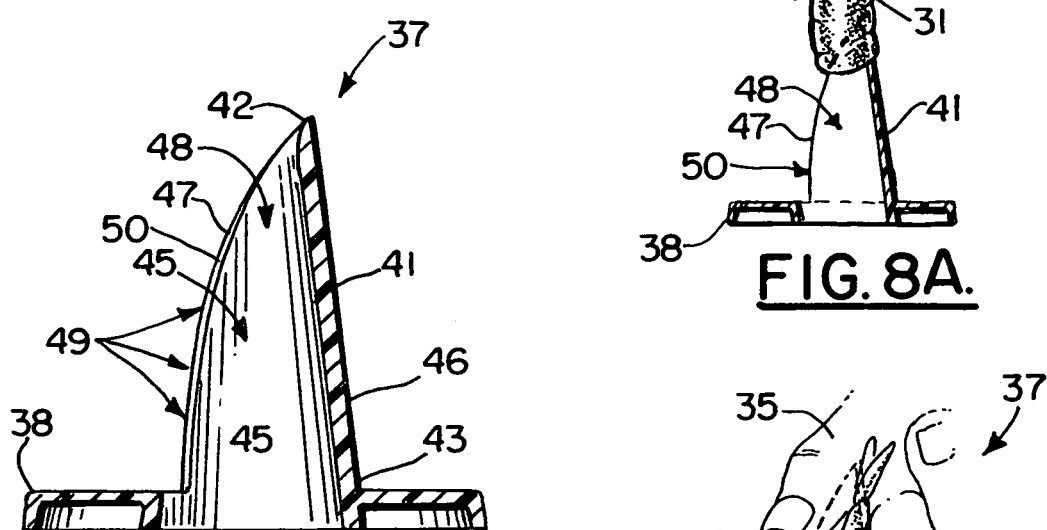
FIG. 7 is a sectional view taken along lines 7—7 of FIG. 6.
Figure 8A:
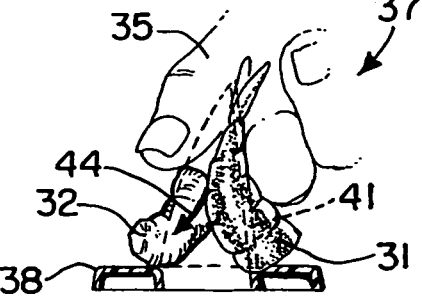
FIG. 8a is a sectional view illustrating the peeling of a tail of a crustacean.
Figure 8B:
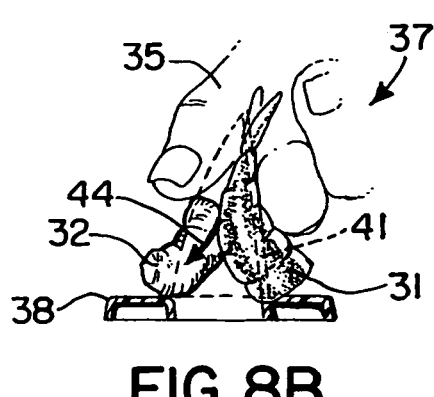
FIG. 8B is another sectional illustration showing removal of the meat from the tail section of a crustacea.

FIGS. 6, 7, 8A, 8B show a second embodiment of the apparatus of the present invention designated generally by the numeral 37 in FIGS. 6, 7, 8A and 8B. Crustacea peeling apparatus 37 provides a base 38 that has a periphery 39 and a central opening 40. Projection 41 extends upwardly from base 38. Projection 41 has an upper end portion 42 and a lower end portion 43 where it joins with base 38. The projection 41 is defined by a curved wall 47 having an inner surface 45 and an outer surface 46. A slot 48 is provided that communicates with inner surface 45 and central opening 40. The curved wall 47 has a greater dimension in a circumferential direction next to lower end portion 43 and central opening 40 when compared to its circumferential dimension next to upper end portion 42. Position 49 designates generally in FIG. 7 the greater circumferential dimension of curved wall 47.

The curved wall 47 terminates at curved edges 50–51. In order to separate the meat product 32 from a crustacea tail 31, a user grasps the crustacea tail 31 with his or her hand 35 and pushes downwardly, threading the hollow shell upon projection 41 in the direction of arrow 44 in FIGS. 8A and 8B. In this fashion, the inside surface of the crustacea tail 31 travels upon the outside surface 46 of projection 41.

The user threads the curved wall 47 in between the shell 31 and meat product 32. In this fashion, the meat product travels in slot 48 and is surrounded by inner surface 45 of curved wall 47. Continued downward movement of the shell 31 in the direction of arrow 44 causes the shell to split open because the curved wall has a greater circumferential dimension next to lower end portion 43 and central opening 40. Thus, the projection 41 and its curved wall 47 are sized and shaped to gradually open the shell 31, splitting it and enabling the meat product 32 to be separated and remain within slot 48.

The crustacea peeling apparatus 37 shown in FIGS. 6, 7, 8A and 8B can be a one piece, injection molded plastic device manufactured of any suitable polymeric or plastic material that is compatible with food.

The following is a list of suitable parts and materials for the various elements of the preferred embodiment of the present invention.

PARTS LIST

| Parts Number | Description |
|---|---|
| 10 | crustacea peeling apparatus |
| 11 | tray |
| 12 | side wall |
| 13 | bottom wall |
| 14 | sleeve |
| 15 | socket |
| 16 | post |
| 17 | upper end portion |
| 18 | lower end portion |
| 19 | keyway |
| 20 | slot |
| 21 | inclined surface |
| 22 | flange |
| 23 | flange |
| 24 | tip |
| 25 | ramp |
| 26 | slot |
| 27 | edge |
| 28 | edge |
| 29 | rear |
| 30 | position |
| 31 | shell |
| 32 | meat product |
| 33 | thick end |
| 34 | arrow |
| 35 | hand |
| 36 | arrow |
| 37 | crustacea peeling apparatus |
| 38 | base |
| 39 | periphery |
| 40 | central opening |
| 41 | projection |
| 42 | upper end portion |
| 43 | lower end portion |
| 44 | arrow |
| 45 | inner surface |
| 46 | outer surface |
| 47 | curved wall |
| 48 | slot |
| 49 | position |
| 50 | curved edge |
| 51 | curved edge |

The foregoing embodiments are presented by way of example only; the scope of the present invention is to be limited only by the following claims.

The invention claimed is:

1. A method of peeling a crawfish tail to separate the edible meat from the exoskeleton shell, comprising;
   a) providing a post that has first and second end portions, the first end portion having a tip, a slot, tapered flanges on opposite sides of the slot, and a base at an end of the slot that is opposite the tip;
   b) threading the crawfish tail upon the tip;
   c) moving the tail toward the base;
   d) using the tip and flanges to expand the tail exoskeleton shell; and
   e) catching the edible meat in the slot.

2. The method of claim 1, wherein in step "a", the tapered flanges are positioned in between the exoskeleton shell and edible meat.

3. The method of claim 1, wherein in step "c" the tail moves downwardly.

4. The method of claim 1, wherein in step "c" the base has an inclined ramp.

5. The method of claim 1, wherein in step "c" the base has an opening.

6. The method of claim 1, wherein in step "a" the post is generally conically shaped.

7. The method of claim 1, wherein the post in step "a" has a conical portion.

8. The method of claim 1, wherein the post has a thin wall surrounding a void space and a step "b" the thin wall is positioned in between the exoskeleton and edible meat.

9. A method of peeling a crawfish tail to separate the edible meat from the exoskeleton shell, comprising;

a) providing a post that has a curved wall with tapered flanges surrounding a slot, a first upper tip portion, a second lower end portion, a hollowed central bore and wherein the wall partially surrounds the bore;
b) threading the crawfish tail upon the upper tip portion;
c) moving the tail toward the base;
d) using the upper tip portion and flanges to expand the tail exoskeleton shell; and
e) catching the edible meat in the slot.

* * * * *